United States Patent
Yokoyama et al.

(10) Patent No.: US 8,791,666 B2
(45) Date of Patent: Jul. 29, 2014

(54) CHARGING CABLE, VEHICLE, AND VEHICLE CHARGING SYSTEM

(75) Inventors: Shinichi Yokoyama, Wako (JP); Mitsuteru Yano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 662 days.

(21) Appl. No.: 12/975,369

(22) Filed: Dec. 22, 2010

(65) Prior Publication Data

US 2011/0199048 A1 Aug. 18, 2011

(30) Foreign Application Priority Data

Feb. 17, 2010 (JP) ................................. 2010-031909

(51) Int. Cl.
 *H02J 7/00* (2006.01)
 *H02J 7/04* (2006.01)
 *B60L 11/18* (2006.01)

(52) U.S. Cl.
 CPC .............. *H02J 7/045* (2013.01); *Y02T 10/7005* (2013.01); *Y02T 10/7088* (2013.01); *B60L 11/1818* (2013.01); *Y02T 90/121* (2013.01); *Y02T 90/14* (2013.01); *B60L 2230/12* (2013.01)
 USPC .......................... 320/109; 320/104; 320/145

(58) Field of Classification Search
 USPC .......................... 320/104, 105, 109, 145, 157
 See application file for complete search history.

(56) References Cited

U.S. PATENT DOCUMENTS

2011/0029144 A1* 2/2011 Muller et al. ................. 700/293

FOREIGN PATENT DOCUMENTS

| | | |
|---|---|---|
| JP | 07-298506 | 11/1995 |
| JP | 2000-166114 | 6/2000 |
| JP | 2003-244862 | 8/2003 |
| JP | 2003-333706 | 11/2003 |
| JP | 2009-100569 | 5/2009 |
| JP | 2009-171733 | 7/2009 |
| JP | 2009-194958 | 8/2009 |
| JP | 2010-004674 | 1/2010 |
| JP | 2010-035277 | 2/2010 |
| WO | WO 2008/117239 | 10/2008 |
| WO | WO 2008/132782 | 11/2008 |

OTHER PUBLICATIONS

Japanese Office Action for corresponding JP Application No. 2010-031909, Oct. 18, 2013.
Japanese Office Action for corresponding JP Application No. 2010-031909, Feb. 3, 2014.

* cited by examiner

*Primary Examiner* — Edward Tso
*Assistant Examiner* — Aaron Piggush
(74) *Attorney, Agent, or Firm* — Mori & Ward, LLP

(57) ABSTRACT

A charging cable for use in charging a vehicle includes a power line, an input section, an oscillator, and a pulse-width adjusting device. The power line is used to carry power from an external power supply to the vehicle. The external power supply and the vehicle are connected to each other with the power line disposed therebetween. A set charging current value in charging the vehicle is input to the input section. The oscillator is configured to generate an oscillation signal having a pulse width within a range of a rated current of the external power supply. The rated current is capable of being supplied to the vehicle. The pulse-width adjusting device is configured to adjust the pulse width of the oscillation signal generated by the oscillator to correspond to the set charging current value input from the input section.

22 Claims, 8 Drawing Sheets

CHARGING CABLE, VEHICLE, AND VEHICLE CHARGING SYSTEM

CROSS-REFERENCE TO RELATED APPLICATIONS

The present application claims priority under 35 U.S.C. §119 to Japanese Patent Application No. 2010-031909, filed Feb. 17, 2010, entitled "Charging Cable, Vehicle, and Vehicle Charging System." The contents of this application are incorporated herein by reference in their entirety.

BACKGROUND OF THE INVENTION

1. Field of the Invention

The present invention relates to a charging cable, a vehicle, and a vehicle charging system.

2. Description of the Related Art

A method of sending a rated current value to a vehicle-mounted charger using a CPL signal (oscillation signal) in charging a storage battery of an electric vehicle from a home alternating-current power supply is specified by a standard. One such example standard is SAEJ1772.

A related-art charging cable of a charging circuit interrupt device (CCID) standard has a central processing unit (CPU) and the function of shutting off leakage. However, it only outputs a pulse signal based on the capacity of a breaker, for example, a home breaker and is unable to adjust a charging current.

Examples of a related-art technique having a relation to the present invention are described in Japanese Unexamined Patent Application Publication No. 2009-100569 (hereinafter referred to as Patent Literature 1) and Japanese Unexamined Patent Application Publication No. 2009-171733 (hereinafter referred to as Patent Literature 2).

A charging cable disclosed in Patent Literature 1 includes a timer capable of setting a charging start time, such as a quick/economy button for use in specifying a charting time period and an extension enable/disable button for use in selecting enabling or disabling of extension to before or after a specific time period of a late-night rate (see, for example, paragraphs 0054 to 0056 and 0111 to 0120 and FIGS. 5 and 11).

Patent Literature 2 describes the use of a pilot signal from an oscillator in a power cable as a seizing signal for a vehicle charging system (see, for example, paragraphs 0046 to 0050 and FIG. 4).

A related-art charging cable can set a time period for charging, but is unable to set a current in charging a storage battery of an electric vehicle. Therefore, it is unable to adjust for usage of household electrical appliances. It is also unable to minutely assign priorities for charging, for example, so as to quickly complete charging depending on the usage of household electrical appliances. In addition, at a site where a breaker dedicated to electric cars does not exist, a charging current reaches a rated current of an outlet, for example, 15 A, and a breaker may trip.

A charger that does not present such problems and can control a charging current is stationary, and its non-portability is inconvenient.

Additionally, there is no charging cable that displays an actual charging current value in charging, and a user cannot identify the magnitude of a charging current with respect to a rated current of a breaker outlet.

SUMMARY OF THE INVENTION

According to one aspect of the invention, a charging cable is for use in charging a vehicle. The charging cable includes a power line, an input section, an oscillator, and a pulse-width adjusting device. The power line is used to carry power from an external power supply to the vehicle. The external power supply and the vehicle are connected to each other with the power line disposed therebetween. A set charging current value in charging the vehicle is input to the input section. The oscillator is configured to generate an oscillation signal having a pulse width within a range of a rated current of the external power supply. The rated current is capable of being supplied to the vehicle. The pulse-width adjusting device is configured to adjust the pulse width of the oscillation signal generated by the oscillator to correspond to the set charging current value input from the input section.

According to another aspect of the invention, a vehicle includes a battery and a charging-current adjusting device. The battery is rechargeable from an external power supply with a charging current through the above charging cable. The charging-current adjusting device adjusts an amount of the charging current correspond to the pulse width in response to the oscillation signal having the pulse width corresponding to the set charging current value output from the oscillator of the charging cable.

According to further aspect of the invention, a vehicle charging system is for a vehicle rechargeable from an external power supply with a charging current through a charging cable. The vehicle charging system includes an input section, an oscillator, a pulse-width adjusting device, and a charging-current adjusting device. A set charging current value in charging the vehicle is input to the input section. The oscillator is configured to generate an oscillation signal having a pulse width within a range of a rated current of the external power supply. The rated current is capable of being supplied to the vehicle. The pulse-width adjusting device is configured to adjust the pulse width of the oscillation signal generated by the oscillator to correspond to the set charging current value input from the input section. The charging-current adjusting device adjusts an amount of the charging current correspond to the pulse width in response to the oscillation signal having the pulse width corresponding to the set charging current value output from the oscillator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
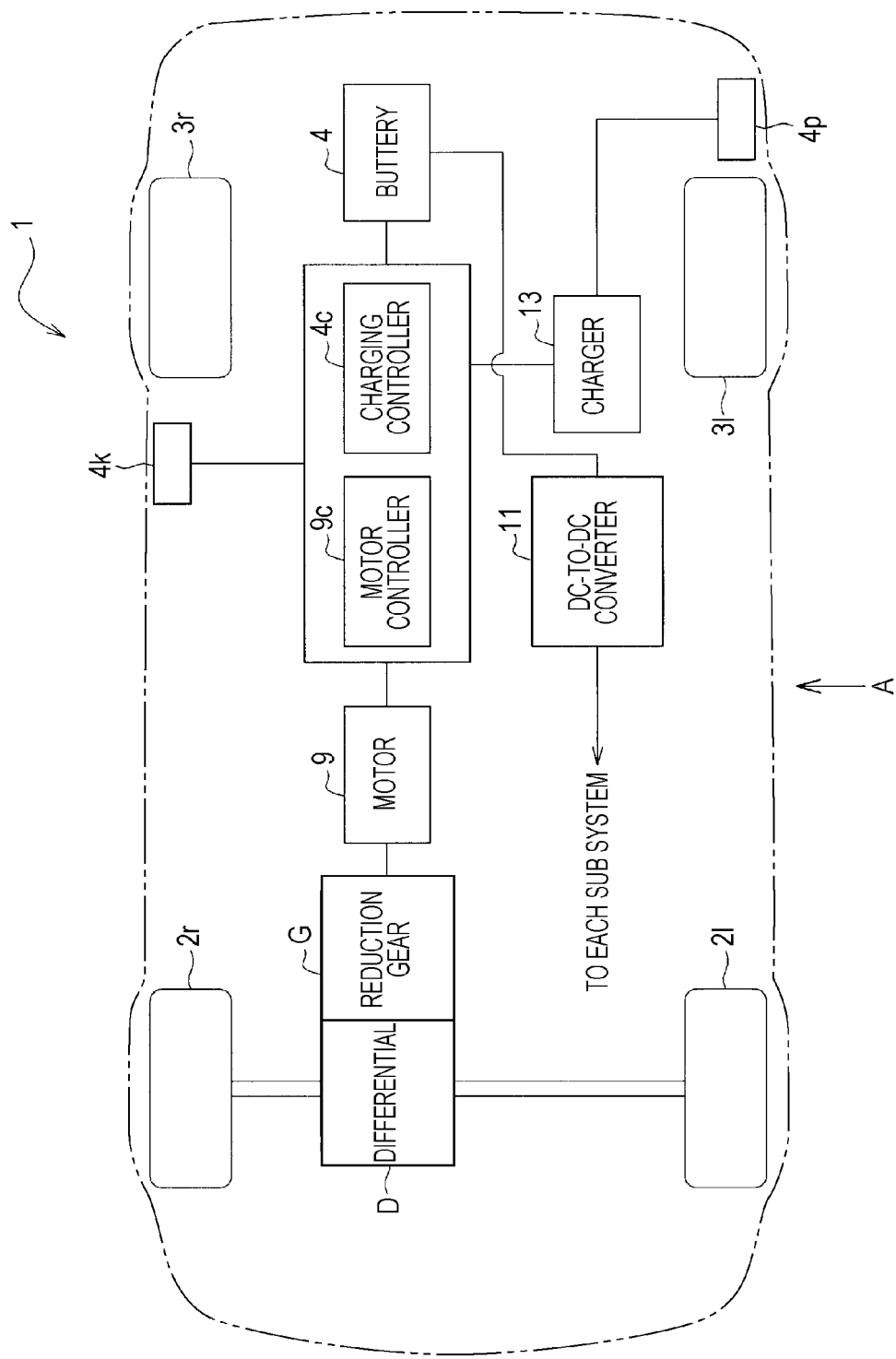
FIG. 1 is a conceptual top view that illustrates a general configuration of a main portion of an electric car according to an embodiment of the present invention.

Embodiments of the present invention are described below with reference to the accompanying drawings, wherein like reference numerals designate corresponding or identical elements throughout the various drawings.

Figure 2:
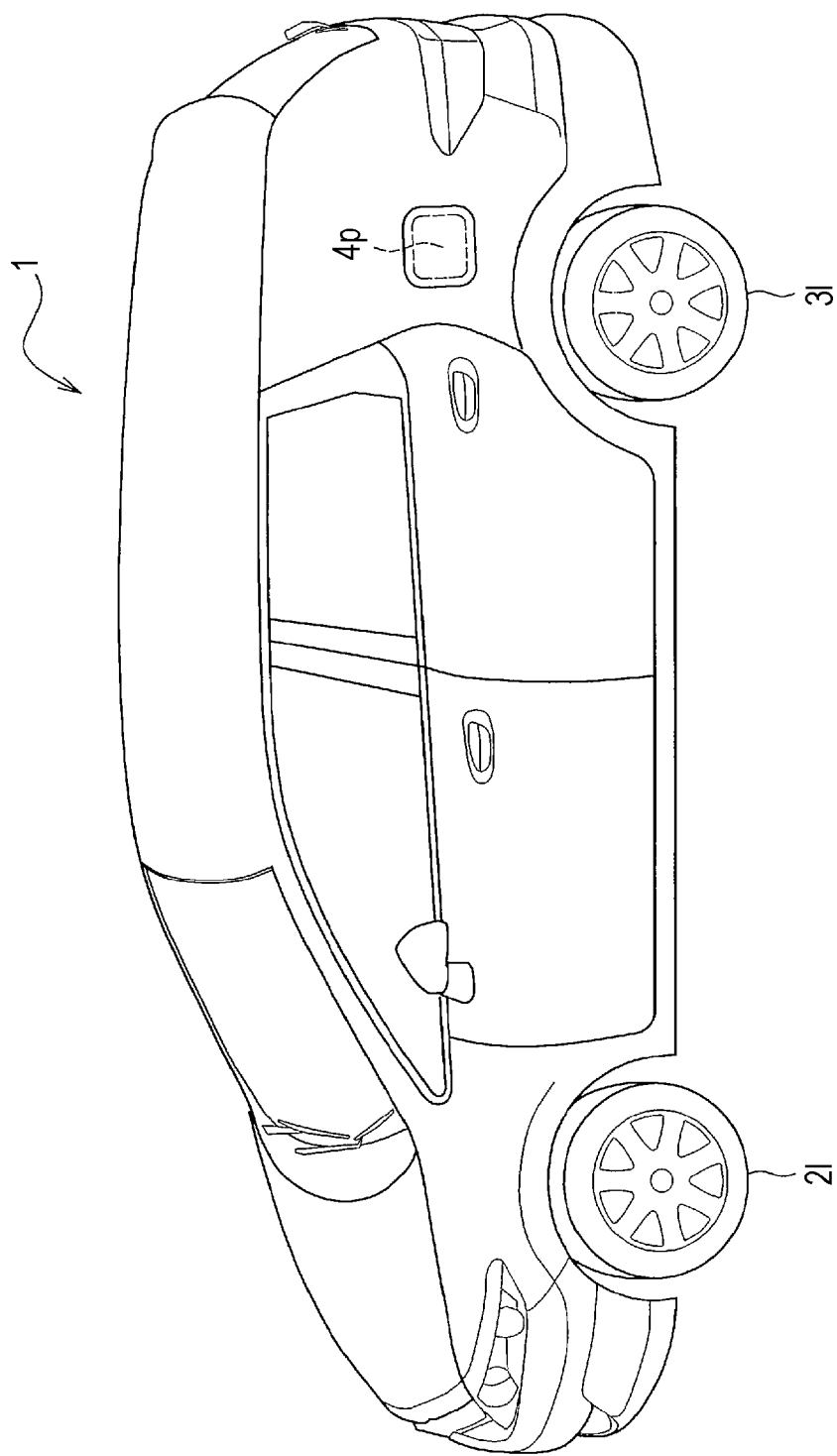
FIG. 2 is a perspective view of the electric car seen from the direction "A" illustrated in FIG. 1.

FIG. 1 is a conceptual top view that illustrates a general configuration of a main portion of an electric car 1 according to an embodiment of the present invention. FIG. 2 is a perspective view of the electric car 1 seen from the direction "A" illustrated in FIG. 1.

Configuration of Electric Car (Vehicle) 1 According to Embodiment

The electric car 1 (hereinafter referred to as EV 1) according to an embodiment includes steerable right and left front wheels 2r and 2l at the both front sides and right and left rear wheels 3r and 3l at both rear sides. The right front wheel 2r and the left front wheel 2l are steered by a driver rotating a steering wheel (handwheel) through a steering shaft.

The EV 1 is a front-engine front-drive (FF) car driven by the right and left front wheels 2r and 2l and includes a motor 9 being a driving source for driving the right and left front wheels 2r and 2l, a reduction gear G for receiving a driving force transmitted from the motor 9 and reducing the speed, and a differential D for receiving a driving force from the reduction gear G after the speed is reduced and adjusting the difference in speed between the right and left front wheels 2r and 2l. For the present embodiment, an alternating-current motor is used as the motor 9, but other motors may also be used.

The EV 1 includes, as components relating to driving of the motor 9, a battery 4, a charging controller 4c, and a motor controller 9c. The battery 4 is an energy source of the motor 9. The charging controller 4c performs cell balance control on the battery 4 and control on charging and discharging. The motor controller 9c includes a control electronic circuit and an inverter and controls the motor 9.

The EV 1 includes, components relating to its power supply, the battery 4 being the energy source, a quick charge connector 4k, a plug-in connector 4p, a charger 13 of a radio-frequency AC-to-DC converter, and a DC-to-DC converter 11. The quick charge connector 4k is used in quick charge to the battery 4 from an external charging station. The plug-in connector 4p is used in charging the battery 4 from an outlet of a home alternating-current power supply. The charger 13 converts an alternating current to a direct current of the home alternating-current power supply and charges the battery 4 through the plug-in connector 4p. The DC-to-DC converter 11 is connected to the battery 4, converts a high voltage to a low voltage, and supplies a necessary power to each sub system.

Figure 3A:
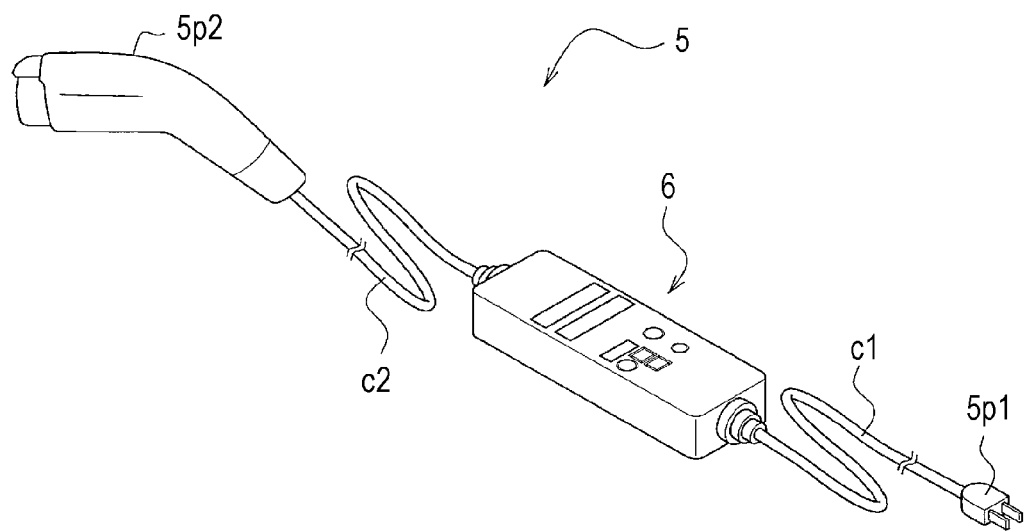
FIG. 3A is a perspective view of a charging cable for use in charging from a home alternating-current power supply to a battery of an EV according to an embodiment.
Figure 3B:
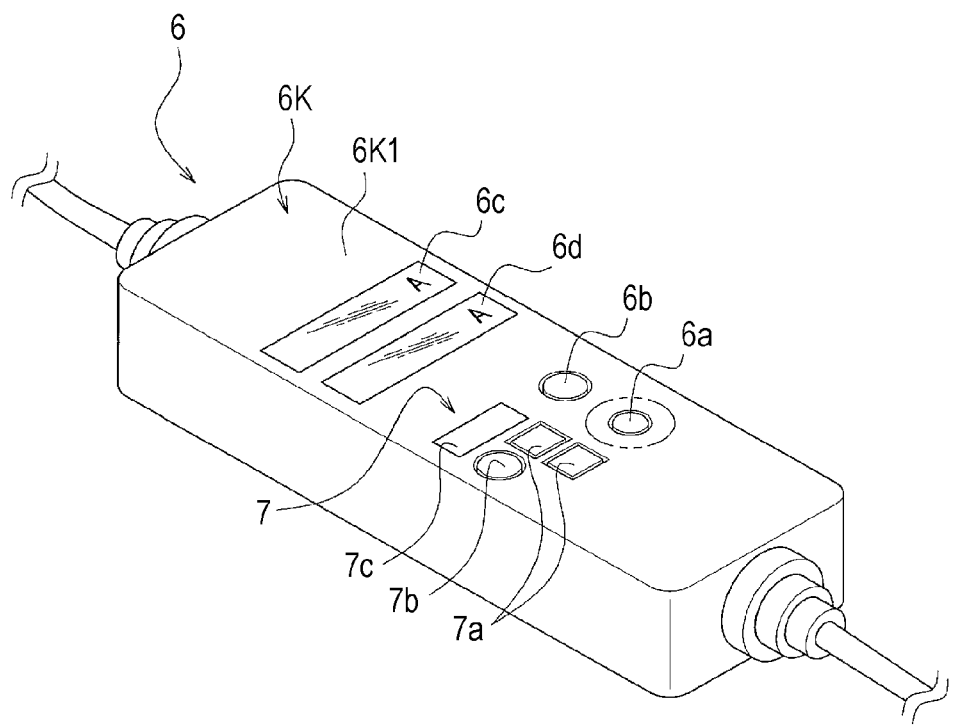
FIG. 3B is an enlarged view of a charge-setting display controller of the charging cable illustrated in FIG. 3A.

FIG. 3A is a perspective view of a charging cable 5 for use in charging the battery 4 of the EV 1 from a home alternating-current power supply. FIG. 3B is an enlarged view of a charge-setting display controller 6 of the charging cable 5 illustrated in FIG. 3A.

The charging cable 5 is a charging cable for controlling a charging current using a CPL signal (oscillation signal) having a pulse width based on the magnitude of a current within a range of a breaker rated current that can be supplied to the battery 4. The charging cable 5 can be a CCID cable that includes a seven-segment indicator capable of displaying, in charging, a charging current value and a charging time specified by a user and an actual charging current value, for example.

The charging cable 5 includes the charge-setting display controller 6, a plug 5p1, and a vehicle plug 5p2. The charge-setting display controller 6 is used in setting charge information by a user, displays the charge information, and performs control on charging. The plug 5p1 is connected to the charge-setting display controller 6 through a cable (power line) c1 and is configured to be inserted by a user into an outlet (not illustrated) of a home alternating-current power supply (external power supply) AC (see FIG. 4). The vehicle plug 5p2 is connected to the charge-setting display controller 6 through a cable (power line) c2 and is configured to be inserted into the plug-in connector 4p of the EV 1 by a user.

The charge-setting display controller 6 (see FIG. 3B) of the charging cable 5 has, as a function relating to settings for charging the EV 1, a charging-current setting volume (input section) 6a, a current key lock ON/OFF button 6b, a set current display section (display section) 6c, and an actual current display section (display section) 6d. The charging-current setting volume 6a is rotated by a user to set a charging current value (set charging current value) in charging. In setting a charging current by a user, the current key lock ON/OFF button 6b is depressed to cancel the lock and, after the charging current value is set, is depressed again to lock and confirm the new setting. The set current display section 6c indicates a charging current set using the charging-current setting volume 6a. The actual current display section 6d indicates a value of a current actually charged to the EV 1 (actual charging current value).

The charging-current setting volume 6a enables a user to finely set a current value. If a push button is used instead of the charging-current setting volume 6a, four charging current values can be set with 2 bits, for example. In this case, simple button operation and simple circuit configuration can be achieved.

The charge-setting display controller 6 further includes a charging-time setting panel 7 for use in setting start and end times in charging the EV 1 by a user. The charging-time setting panel 7 includes a time setting button 7a, a time key lock ON/OFF button 7b, and a set time display section 7c. The time setting button 7a is depressed to set start and end times of charging by a user. In setting start and end times of charging by a user, the time key lock ON/OFF button 7b is depressed to cancel the lock and, after the start and end times are set, is depressed again to lock and confirm the new setting. The set time display section 7c indicates a time set using the time setting button 7a.

The time setting button 7a may be a volume that enables a user to set a time by rotating it, as an alternative to the push button.

If the buttons and volume of the operation section of the charge-setting display controller 6 projects through an outer surface 6K1 of an outer case 6K forming the housing of the charge-setting display controller 6, when the charge-setting display controller 6 is bumped against an object, the setting may be unintentionally changed. To avoid this, the buttons and volume of the operation section of the charge-setting display controller 6 are disposed back from the outer surface 6K1 of the outer case 6K so as not to project through the outer surface 6K1.

Specifically, the charging-current setting volume 6a, the current key lock ON/OFF button 6b, the time setting button 7a, and the time key lock ON/OFF button 7b, which correspond to the operation section of the charge-setting display controller 6, are disposed back from the outer surface 6K1 of the outer case 6K of the charge-setting display controller 6 so as not to project through the outer surface 6K1.

To facilitate a user to operate the charging-current setting volume 6a, as indicated by the dot-dot-dash line in FIG. 3B, a recess portion in which the charging-current setting volume 6a is arranged of the outer case 6K may be larger than the size of the charging-current setting volume 6a such that there is a gap between the edge of the recess portion and that of the charging-current setting volume 6a.

To avoid the setting from being unintentionally changed by an object bumped against the operation section, as described above, the charge-setting display controller 6 includes the current key lock ON/OFF button 6b serving as the key locking function in setting a charging current and the time key lock ON/OFF button 7b serving as the key locking function in setting a charging time.

To set or change a charging current or a time, the current or time key lock ON/OFF button 6b or 7b is depressed to cancel the lock. After an input of a set current or time, the input is made to be an input signal by depressing of the current or time key lock ON/OFF button 6b or 7b. To change the set current or time, the setting is cleared by re-depressing of the current or time key lock ON/OFF button 6b or 7b. In this way, the setting can be reliably prevented from being unintentionally changed by an object bumped against the charging cable 5.

Internal Configuration of Charge-Setting Display Controller 6 of Charging Cable 5

Figure 4:
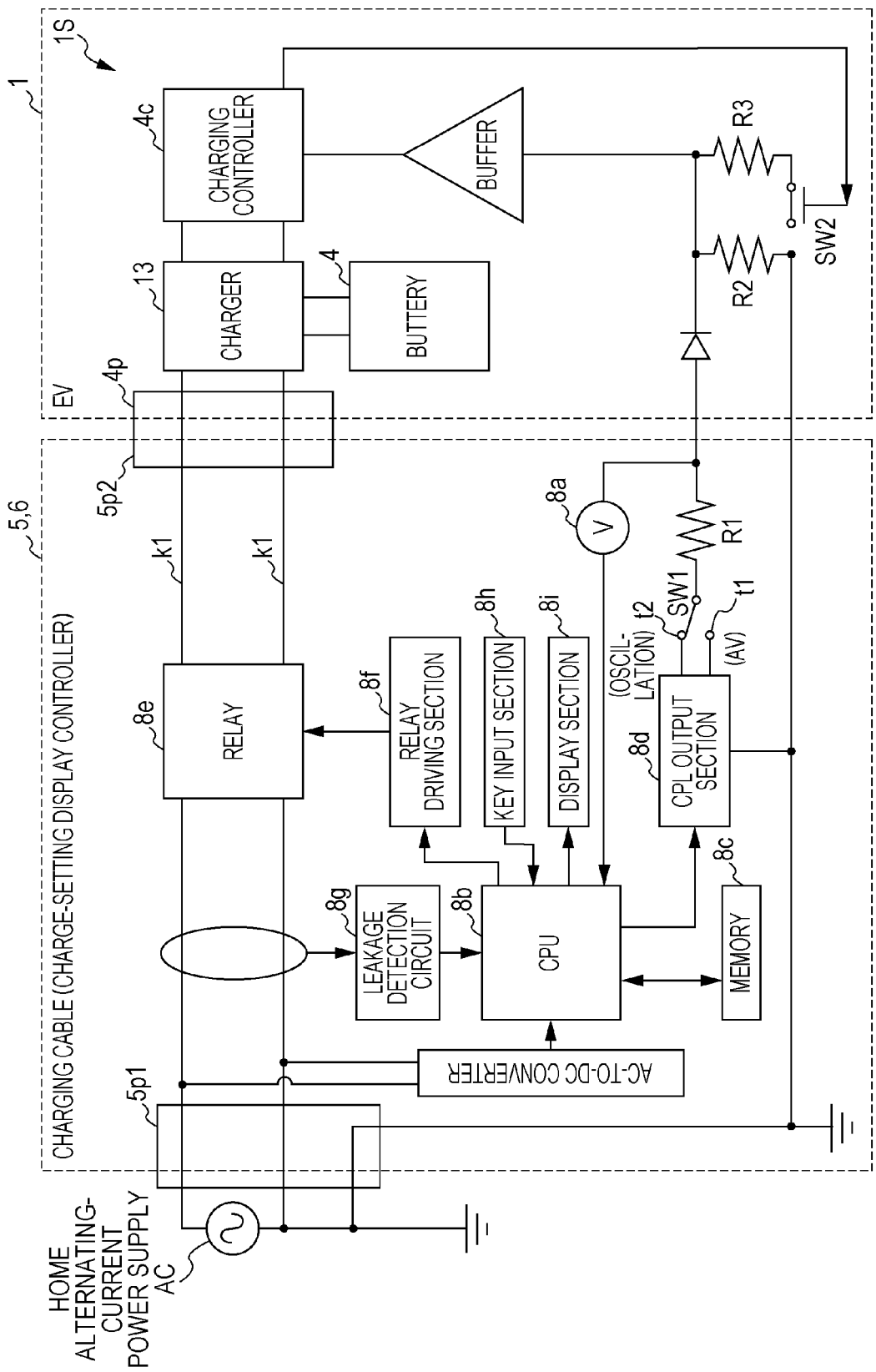
FIG. 4 illustrates an internal configuration of the charge-setting display controller for controlling charging the EV and a charging configuration of the EV according to an embodiment.

Next, an internal configuration of the charge-setting display controller 6 for controlling charging the EV 1 in the charging cable 5 is described with reference to FIG. 4. FIG. 4 illustrates an internal configuration of the charge-setting display controller 6 for controlling charging the EV 1 and a charging configuration 1S of the EV 1.

When a user inserts the plug 5p1 (see FIG. 3A) of the charging cable 5 into an outlet of a home alternating-current power supply AC and inserts the vehicle plug 5p2 (see FIG. 3A) into the plug-in connector 4p (see FIGS. 1 and 2) of the EV 1, the home alternating-current power supply AC, the charge-setting display controller 6 of the charging cable 5 and the charging configuration 1S of the EV 1 become connected, as illustrated in FIG. 4.

The charge-setting display controller 6 of the charging cable 5 includes a central processing unit (CPU) (pulse-width adjusting unit, display unit, adjustment unit, key lock unit) 8b, a memory 8c, an AC-to-DC converter, a voltmeter 8a, and a CPL output section (oscillator) 8d. The CPU 8b exercises control over charging the EV 1. The memory 8c is a storage section for the CPU 8b. The AC-to-DC converter converts an alternating-current voltage supplied from the home alternating-current power supply AC to a specific direct-current voltage and supplies it to the CPU 8b. The voltmeter 8a transmits voltage information to the CPU 8b. The CPL output section 8d generates a CPL signal (oscillation signal) having a pulse width corresponding to a signal output from the CPU 8b. A power-supply voltage supplied from the home alternating-current power supply AC is measured in the AC-to-DC converter disposed at the location illustrated in FIG. 4, and the measurement is transmitted to the CPU 8b.

The pulse width of a CPL signal can be changed by, for example, the CPU 8b or an oscillator circuit employing an existing technique. The CPL output section 8d generates a CPL signal (oscillation signal) having a pulse width within a range of a rated current of the home alternating-current power supply AC (external power supply).

The charge-setting display controller 6 includes a relay 8e, a relay driving section 8f, and a leakage detection circuit 8g. The relay 8e adjusts a connection k1 for connecting the home alternating-current power supply AC and the charging configuration 1S of the EV 1 in response to an instruction to start or end charging mode (checking occurrence of leakage, charging) and switches on or off the connection k1 in non-leaking situation or leaking situation. The relay driving section 8f drives the relay 8e. The leakage detection circuit 8g detects leakage from the connection k1.

The charge-setting display controller 6 include, as a configuration relating to an input to the charge-setting display controller 6, a key input section (input section, pulse-width adjusting unit, input-signal generating unit) 8h. The key input section 8h generates an input signal corresponding to operation information (set charging current value) on each of the current and time key lock ON/OFF buttons 6b and 7b, the charging-current setting volume 6a, and the time setting button 7a, which are the input section of the charge-setting display controller 6 illustrated in FIG. 3B.

The charge-setting display controller 6 further includes, as a configuration relating to displaying about charging, a display section (display unit) 8i. The display section 8i receives display information from the CPU 8b and indicates it on the set current display section 6c, the actual current display section 6d, and the set time display section 7c, which are the display section of the charge-setting display controller 6 illustrated in FIG. 3B. An actual charging current value to the battery 4 is displayed on the actual current display section 6d by obtainment of charging information from the charger 13 of the EV 1 by the CPU 8b.

The charge-setting display controller 6 further includes a switch SW1 for switching between a terminal t1 and a terminal t2 of the CPL output section 8d and a resistor R1. The CPL output section 8d outputs an oscillation signal of a CPL signal from the terminal t1 and outputs a constant-voltage signal from the terminal t2.

Charging Configuration 1S for Use in Charging EV 1

Next, the charging configuration 1S used in charging the EV 1 is described.

The charging configuration 1S of the EV 1 illustrated in FIG. 4 includes the battery 4, the charger 13, the charging controller 4c, which are previously described with reference to FIG. 1, and a switch SW2 for switching charging on in response to instruction information to perform charging and switching charging off in response to instruction information to stop the charging from the charging controller 4c.

The charging configuration 1S of the EV 1 further includes, components forming a charging control circuit, resistors R2 and R3, a diode, and a buffer.

Charging EV 1 Using Charging Cable 5

In charging the battery 4 of the EV 1 using the charging cable 5, the CPL output section 8d of the charge-setting display controller 6 of the charging cable 5 generates a CPL signal (oscillation signal) having a pulse width indicating the magnitude of a current for charging the battery 4 on the basis of the magnitude of a rated current that can be supplied to the battery 4 in response to instruction information to perform charging the battery 4 from the CPU 8b and transmits it from the charge-setting display controller 6 of the charging cable 5 to the charging controller 4c of the EV 1.

Figure 5:
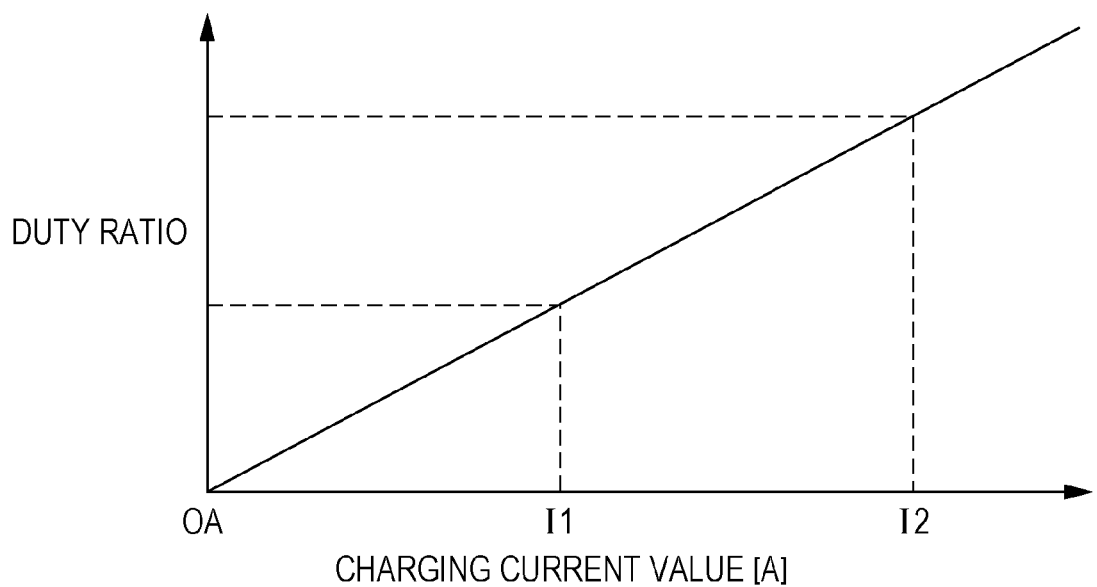
FIG. 5 illustrates a relationship between a duty ratio of a CPL signal and a magnitude of a charging current value in charging the battery of the EV according to an embodiment.

When receiving a CPL signal from the CPL output section 8d of the charging cable 5, the charging controller 4c of the EV 1 supplies a charging current corresponding to a duty ratio (pulse width) of the CPL signal, as illustrated in FIG. 5, using the charger 13 from a power-supply voltage supplied from the home alternating-current power supply AC to the battery 4 of the EV 1. Specifically, an input current limit value of the vehicle-mounted charger 13 is defined by a duty ratio of a CPL signal.

FIG. 5 illustrates a relationship between a duty ratio of a CPL signal and a magnitude of a charging current value in charging the battery 4 of the EV 1.

A user can set a charging current by depressing the current key lock ON/OFF button 6b of the charging cable 5 to cancel the lock, irrespective of whether the present time is before charging or during charging, setting a desired charging current value using the charging-current setting volume 6a, and then depressing the current key lock ON/OFF button 6b to confirm and lock the set charging current value.

Configuration that does not Respond to Switching of Charging Current Set by Operator (User) and Method for Notifying User A problem may arise when a charging current is switched by setting by a user. For example, in consideration of a case where a breaker of a home power supply trips, the following three functions are added to the charge-setting display controller 6 of the charging cable 5.

A first function enables a user to previously set a maximum usable current that can be used in household electrical appliances using the charging-current setting volume 6a of the charging cable 5 on the basis of a breaker rated current and to set a charging current (set charging current) within a range in which the set charging current breaker rated current−maximum usable current using the charging-current setting volume 6a. In setting the maximum usable current, communication with a power-supply side of the home alternating-current power supply AC can be performed, and a current being used in household electrical appliances can be displayed on the charging cable 5.

A second function enables communicating with the power-supply side of the home alternating-current power supply AC, setting a maximum supply current value in charging so as not to exceed the upper limit "breaker rated current−used current in household electrical appliances (current being used in household electrical appliances)," and setting a charging current within a range of the maximum supply current value using the charging-current setting volume 6a.

Alternatively, it enables selecting mode at which the maximum current value for a charging current is saved in the above-described way or mode at which the breaker is tripped without such saving.

For both the first function and the second function, communication with the power-supply side of the home alternating-current power supply AC can be performed, and a breaker rated current and a current being used in household electrical appliances can be displayed on the charging cable 5 (display function).

A third function is an additional function to the second function and is performed to avoid exceeding a breaker rated current even when a plurality of EVs 1 is charged from the single breaker. The third function enables communication using a communication unit (not illustrated) of each of the charging cables 5 during charging and enables identifying used currents therein.

The third function enables saving a maximum current value in charging each EV 1 using the value of (breaker rated current−current used in household electrical appliances)÷the number of vehicles charged.

The charging cable 5 may have any one of the first to third functions, and more than one of the first to third functions. Alternatively, it may select any one of the first to third functions.

Control on Charging Using Charging Cable 5

Next, control on charging the EV 1 using the charging cable 5 is described.

Stationary Control on Charging EV 1 Using Charging Cable 5

Stationary control being main control on charging using the charging cable 5 is first described with reference to FIG. 6, which illustrates a stationary control process on the charging, and, as needed, FIG. 7. FIG. 7 is a timing chart that illustrates one example control on charging the EV 1 using the charging cable 5.

Figure 6:
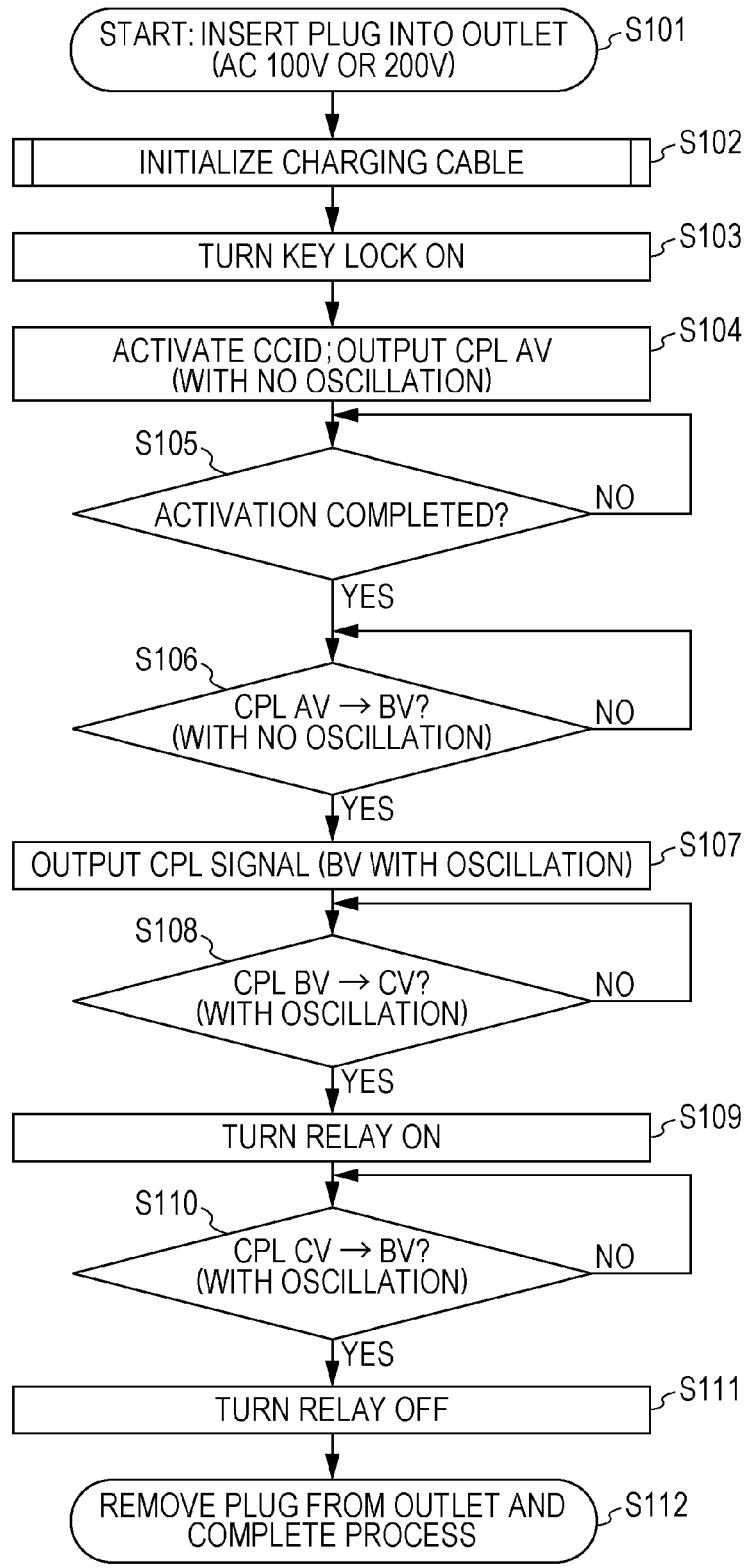
FIG. 6 illustrates a stationary control process for controlling charging the EV using the charging cable according to an embodiment.
Figure 7:
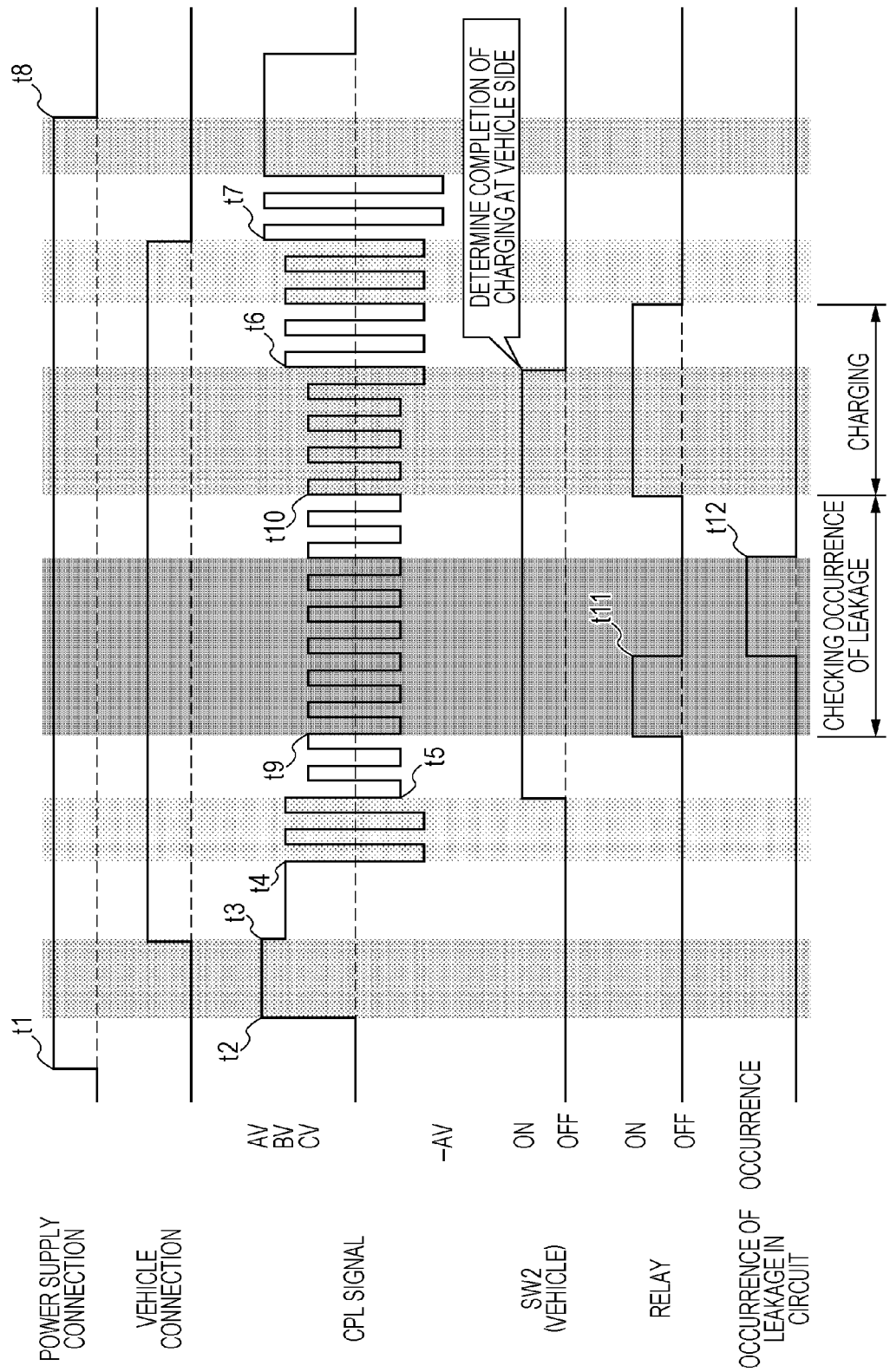
FIG. 7 is a timing chart illustrating control on charging the EV using the charging cable according to an embodiment.

In S101 in FIG. 6, the charging cable 5 becomes connected to the home alternating-current power supply AC (see FIG. 4) by insertion of the plug 5p1 (see FIG. 3A) of the charging cable 5 into an outlet of the home alternating-current power supply AC by a user, and stationary control on charging is performed by the charge-setting display controller 6 of the charging cable 5 starts (at time t1 in FIG. 7). Then, in S102, the CPU 8b (see FIG. 4) of the charge-setting display controller 6 carries out initial setting of, for example, the memory 8c to start the stationary control on charging.

Then, in S103, the CPU 8b turns the key lock state on to prevent a charging current from being changed without intention of the user. In S104, the switch SW1 becomes connected to the terminal t1 of the CPL output section 8d illustrated in FIG. 4, and an AV signal having no oscillation is output (at time t2 in FIG. 7). The charge-setting display controller 6 of the charging cable 5 is activated.

Then, in S105, the CPU 8b determines whether the activation of the charge-setting display controller 6 has been completed.

If the activation of the charge-setting display controller 6 has not been completed (NO in S105 in FIG. 6), S105 continues.

If it is determined in S105 in FIG. 6 that the activation of the charge-setting display controller 6 has been completed (YES in S105), it is determined in S106 whether the voltage AV from the terminal t1 of the CPL output section 8d illustrated in FIG. 4 becomes a divided voltage BV of the resistors R1 and R2 (at time t3 in FIG. 7) in response to insertion of the vehicle plug 5p2 (see FIG. 3A) of the charging cable 5 into the plug-in connector 4p (see FIGS. 1 and 2) by the user.

If the vehicle plug 5p2 of the charging cable 5 is not inserted into the plug-in connector 4p of the EV 1 by the user and the voltage AV of the CPL signal from the CPL output section 8d does not become BV (NO in S106), S106 continues.

In S106 illustrated in FIG. 6, if it is determined that the vehicle plug 5p2 (see FIG. 3A) of the charging cable 5 is inserted into the plug-in connector 4p of the EV 1 by the user and the voltage AV of the CPL signal from the CPL output section 8d illustrated in FIG. 4 becomes BV (YES in S106), the switch SW1 is switched to the terminal t2, and the CPL signal (oscillation signal) of the voltage BV is output from the CPL output section 8d (at time t4 in FIG. 7) in S107.

Then, a signal to start charging is transmitted from the charging controller 4c illustrated in FIG. 4 to the switch SW2, the switch SW2 is turned on, and it is determined whether the voltage BV of the CPL signal (oscillation signal) becomes a divided voltage CV of the resistors R1, R2, and R3 (at time t5 in FIG. 7) in S108.

If the voltage BV of the CPL signal (oscillation signal) does not become CV (NO in S108), S108 continues.

In S108 in FIG. 6, if it is determined that the switch SW2 is turned on and the voltage BV of the CPL signal (oscillation signal) becomes CV (at time t5 in FIG. 7) (YES in S108), the relay 8e illustrated in FIG. 4 is turned on in step S109, and charging starts.

In S110, a signal to end charging is transmitted from the charging controller 4c illustrated in FIG. 4 to the switch SW2, the switch SW2 is turned off, and it is determined whether the voltage CV, which is the divided voltage of the resistors R1, R2, and R3, of the CPL signal (oscillation signal) becomes BV, which is the divided voltage of the resistors R1 and R2 (at time t6 in FIG. 7). That is, it is determined whether information indicating an end of the charging has been issued from the charging controller 4c.

If the voltage CV of the CPL signal (oscillation signal) does not become BV (NO in S110), because information indicating the end of the charging has not been issued from the charging controller 4c and the charging continues, S110 continues.

In S110 in FIG. 6, if it is determined that the voltage CV of the CPL signal (oscillation signal) becomes BV (YES in S110), the relay 8e illustrated in FIG. 4 is turned off in S111. Then, in S112, the user removes the vehicle plug 5p2 of the charging cable 5 illustrated in FIG. 3A from the plug-in connector 4p of the EV 1 (at time t7 in FIG. 7) and removes the plug 5p1 of the charging cable 5 from the outlet of the home alternating-current power supply AC (see FIG. 4) (at time t8 in FIG. 7), and the charging using the charging cable 5 has been completed.

This is one example stationary control process on charging the EV 1 using the charging cable 5 illustrated in FIG. 6.

Variable Charging-Current Control in Changing Charging Current Using Charging Cable 5

Next, variable charging-current control in changing the charging current by a user using the current key lock ON/OFF button 6b and the charging-current setting volume 6a of the charging cable 5, which are illustrated in FIG. 3B, is described with reference to FIG. 8, which illustrates the process of the variable charging-current control.

Figure 8:
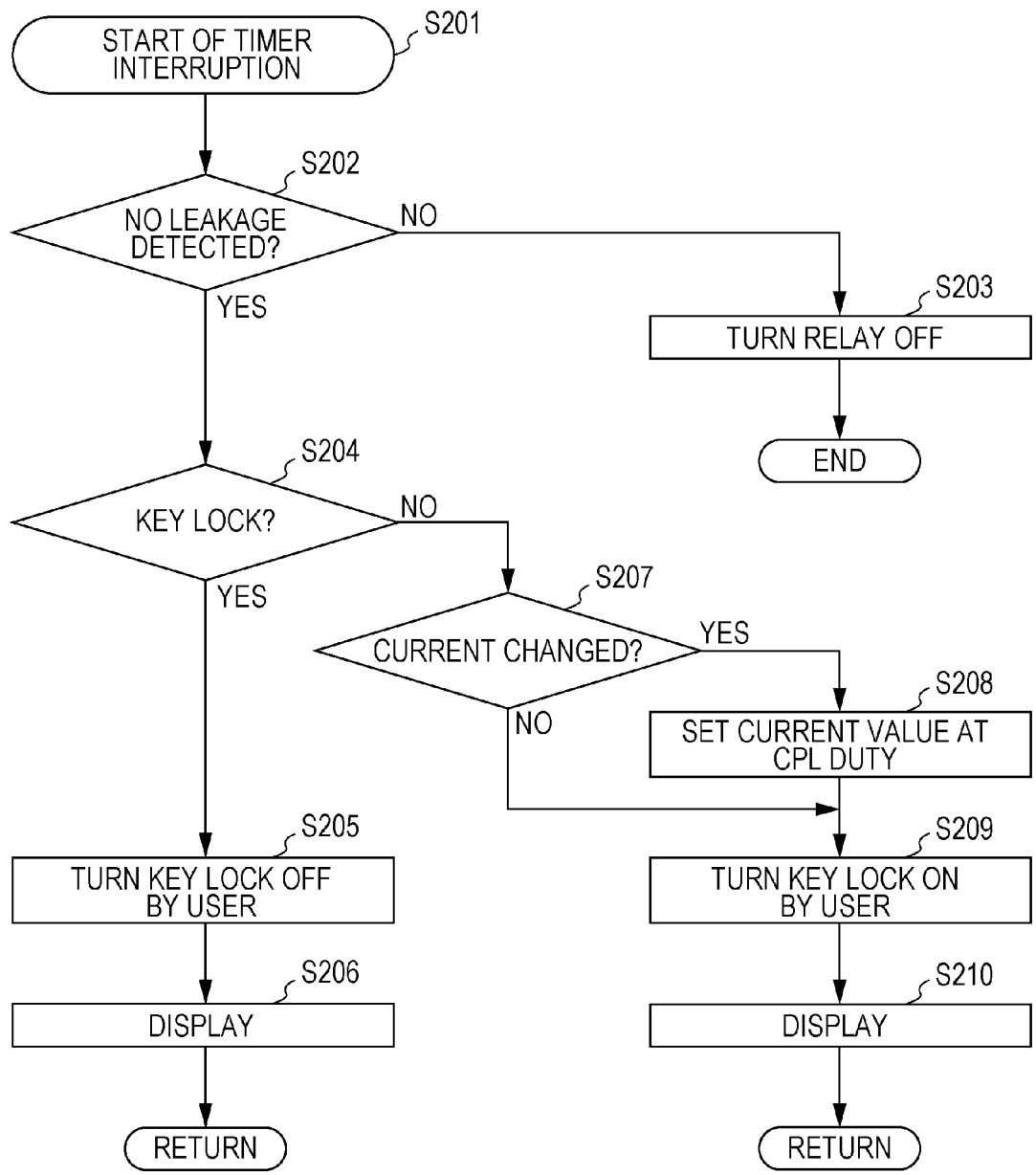
FIG. 8 illustrates a variable charging-current control process occurring to change a charging current according to an embodiment.

In S201 in FIG. 8, when the user operates the charging-current setting volume 6a of the charge-setting display controller 6 illustrated in FIG. 3B to set a charging current, an operation signal is transmitted from the key input section 8h illustrated in FIG. 4 to the CPU 8b, and an interruption request signal is output from an interruption control circuit (not illustrated) to the CPU 8b. This enables the user to set a current even during charging.

There are two possible cases in setting a charging current value: a correct operation case in which the charging current value is set by operation on the charging-current setting volume 6a after cancellation of the lock by depressing of the current key lock ON/OFF button 6b, and an incorrect operation case in which the charging current value is set by only operation on the charging-current setting volume 6a without operation on the current key lock ON/OFF button 6b.

Then, in S202, it is determined by the use of the leakage detection circuit 8g illustrated in FIG. 4 whether there is a leakage occurring in the connection k1 for use in charging (between times t9 and t10 in FIG. 7). FIG. 7 illustrates a case where a leakage occurs at time t11 and the connection k1 recovers from the leakage at time t12.

If there is a leakage (YES in S202), the relay 8e illustrated in FIG. 4 is turned off (at time t11 in FIG. 7) in S203, and the process is completed.

In S202 in FIG. 8, if it is determined that there is no leakage occurring in the connection k1 for use in charging (NO in S202), in S204, it is determined in the CPU 8b in FIG. 4 whether the key lock has been made. That is, in S204, it is determined whether the setting is key-locked because the user does not depress the current key lock ON/OFF button 6b illustrated in FIG. 3B in S204 and the previous setting remains locked.

If the setting is key locked (YES in S204), because the key locking is displayed on the set current display section 6c illustrated in FIG. 3B, the user depresses the current key lock ON/OFF button 6b illustrated in FIG. 3B in S205 to cancel the lock, and the message saying "The key lock has been cancelled. Please set a charging current." is displayed on, for example, the set current display section 6c illustrated in FIG. 3B in S206. After that, in response to the message "The key lock has been cancelled. Please set a charging current." on the display section of the charging cable 5, the user operates the charging-current setting volume 6a of the charge-setting display controller 6 illustrated in FIG. 3B to set a charging current value. Then, the process returns to S201 in FIG. 8.

In S204 in FIG. 8, if it is determined that the key lock has not been made (NO in S204), that is, if the user has performed correct operation by depressing the current key lock ON/OFF button 6b and cancelling the lock, it is determined in S207 whether the charging current value has been changed by the user rotating the charging-current setting volume 6a illustrated in FIG. 3B.

If the charging current value has been changed (YES in S207), a duty ratio (see FIG. 5) corresponding to the set current value by the user is set to a CPL signal of the CPL output section 8d in S208, and the set charging current value is confirmed and key-locked by the user depressing the current key lock ON/OFF button 6b in FIG. 3B in S209. Then, the message indicating that the current value set by the user has been set at the charging current value is displayed on, for example, the set current display section 6c of the display section of the charging cable 5 in FIG. 3B in S210, and the process is completed.

In S207 in FIG. 8, if it is determined that the charging current has not been changed (NO in S207), the key lock is made by the user depressing the current key lock ON/OFF button 6b illustrated in FIG. 3B in S209, and the message indicating that the existing set current value is set at the charging current is displayed on the set current display section 6c of the display section of the charging cable 5 in FIG. 3B in S210. Then, the process is completed.

This is one example variable charging-current control process in changing the charging current using the charging cable 5 illustrated in FIG. 8.

Unlike the example described with reference to FIG. 8, even if the user inputs a current value in a locked state, the current value input by the user may be temporarily stored and, after that, when the user depresses the current key lock ON/OFF button 6b (see FIG. 3B), the locked state may be cancelled, and the input of the temporarily stored current value may be accepted.

Operational Effects

With the above-described configuration, a current value at or below the rating of a breaker can be finely set using the charging cable 5, and thus a charging current can be adjusted to usage of household electrical appliances. For example, in charging a plurality of EVs 1, their charging current values can be set within a range where the breaker does not trip.

Specifically, for a rated current of a 15 A breaker, charging vehicles with 10 A and 5 A can be made.

In charging a plurality of EVs 1, priorities for charging can be assigned so as to enable quick charge of a specific EV 1.

In contrast to a related-art stationary charger capable of controlling a charging current, the charging cable 5 is portable.

In addition, even at a site where there is no breaker dedicated to an EV, setting a small current value using the charging cable 5 can prevent the current value from reaching 15 A, which is a rating of an outlet. Therefore, an inconvenient trip does not occur in a breaker.

The user can identify a charging current and thus is able to calculate a current value that can be distributed to household electrical appliances.

Identifying a set charging current value and an actual charging current value enables the user to recognize the occurrence of an anomalous condition from a usage state of household electrical appliances on the basis of a breaker rated current.

In this way, because an adjustment device that allows a charging current to be adjusted is disposed in the charging cable 5, the charging current can be adjusted within a range of a rated current of a home breaker during charging from a home power supply, and the user (operator) can adjust the charging current in accordance with needs for charging the EV 1 and usage of household electrical appliances. Therefore, quick charging of a single EV 1 and charging a plurality of EVs 1 with small currents can be achieved using the charging cable.

In the foregoing embodiment, an electric car is described as an example vehicle. However, the charging cable can be used in a wide variety of vehicles other than an electric car, such as a plug-in hybrid car, as long as the vehicle has a battery.

According to the embodiment of the present invention, the charging cable allows setting a charging current to be supplied to a vehicle. Therefore, the charging current can be adjusted to usage of household electrical appliances. Additionally, in charging a plurality of vehicles, a desired charge current to be supplied to each vehicle can be set. The charging cable is also portable.

In the charging cable according to the embodiment of the invention, the pulse-width adjusting unit may include an input-signal generating unit that generates an input signal corresponding to the set charging current value input from the input section and an adjustment unit that adjusts the pulse width of the oscillation signal generated by the oscillator to the input signal.

The charging cable allows setting a charging current to be supplied to a vehicle. Therefore, the charging current can be adjusted to usage of household electrical appliances. Additionally, in charging a plurality of vehicles, a desired charge current to be supplied to each vehicle can be set. The charging cable is also portable.

The charging cable according to the embodiment of the invention may further include a display unit that displays the set charging current value input from the input section and an actual charging current value on a display section thereof.

With the charging cable, a user can identify a charging current value and thus calculate a current value that can be distributed to household electrical appliances. The user can also identify a set charging current value and an actual charge current value and thus recognize an anomalous condition.

The charging cable according to the embodiment of the invention may further include a key lock unit that forbids the input section from accepting an input when it is operated in a locked state and that allows the input section to accept an input set charging current value when it is operated in an unlocked state.

With the charging cable, an incorrect operation in inputting and setting a set charging current value from the input section can be reliably prevented.

In the charging cable according to the embodiment of the invention, the input section may be disposed back from an outer surface of an outer case forming a housing of the charging cable.

With the charging cable, because the input section is disposed back from the outer surface of the outer case forming the housing, an unintentional incorrect operation can be prevented.

According to the embodiment of the invention, a vehicle includes a battery and a charging-current adjusting unit. The battery is rechargeable from an external power supply with a charging current through a charging cable. In response to an oscillation signal having a pulse width corresponding to a set charging current value output from the oscillator of the charging cable according to the first aspect, the charging-current adjusting unit makes a magnitude of the charging current correspond to the pulse width.

With the vehicle, the magnitude of the charging current can be specified so as to correspond to the set charging current value output from the oscillator of the charging cable.

According to the embodiment of the invention, a vehicle charging system for a vehicle rechargeable from an external power supply with a charging current through a charging cable includes an input section from which a set charging current value in charging the vehicle is input, an oscillator, a pulse-width adjusting unit, and a charging-current adjusting unit. The oscillator generates an oscillation signal having a pulse width within a range of a rated current of the external power supply, the rated current being capable of being supplied to the vehicle. The pulse-width adjusting unit adjusts the pulse width of the oscillation signal generated by the oscillator to the set charging current value input from the input section. In response to the oscillation signal having the pulse width corresponding to the set charging current value output from the oscillator, the charging-current adjusting unit makes a magnitude of the charging current correspond to the pulse width.

With the vehicle charging system, because the magnitude of the charging current can be specified so as to correspond to the set charging current value input from the input section, the charging current can be adjusted to usage of household electrical appliances, and a desired charging current to be supplied to each vehicle can be set in charging a plurality of vehicles.

In the vehicle charging system according to the embodiment of the invention, the pulse-width adjusting unit may include an input-signal generating unit that generates an input signal corresponding to the set charging current value input from the input section and an adjustment unit that adjusts the pulse width of the oscillation signal generated by the oscillator to the input signal.

With the vehicle charging system, because the magnitude of the charging current can be specified so as to correspond to the set charging current value input from the input section, the charging current can be adjusted to usage of household electrical appliances, and a desired charging current to be supplied to each vehicle can be set in charging a plurality of vehicles.

The vehicle charging system according to the embodiment of the invention may further include a display unit that displays the set charging current value input from the input section and an actual charging current value on a display section thereof.

With the vehicle charging system, a user can identify a charging current value and thus calculate a current value that can be distributed to household electrical appliances. The user can also identify a set charging current value and an actual charge current value and thus recognize an anomalous condition.

The vehicle charging system according to the embodiment of the invention may further include a key lock unit that forbids the input section from accepting an input when it is operated in a locked state and that allows the input section to accept an input set charging current value when it is operated in an unlocked state.

With the vehicle charging system, an incorrect operation in inputting and setting a set charging current value from the input section can be reliably prevented.

In the vehicle charging system according to the embodiment of the invention, the input section may be disposed back from an outer surface of an outer case forming a housing thereof.

With the vehicle charging system, because the input section is disposed back from the outer surface of the outer case forming the housing, an unintentional incorrect operation can be prevented.

Obviously, numerous modifications and variations of the present invention are possible in light of the above teachings. It is therefore to be understood that within the scope of the appended claims, the invention may be practiced otherwise than as specifically described herein.

What is claimed is:

1. A charging cable for use in charging a vehicle, the charging cable comprising:
   a power line used to carry power from an external power supply to the vehicle, the external power supply and the vehicle being connected to each other with the power line disposed therebetween;
   an input section to which a set charging current value in charging the vehicle is input;
   an oscillator configured to generate an oscillation signal having a pulse width within a range of a rated current of the external power supply, the rated current being capable of being supplied to the vehicle;
   a pulse-width adjusting device configured to adjust the pulse width of the oscillation signal generated by the oscillator to correspond to the set charging current value input from the input section; and
   a charging current setting device configured to communicate with a power-supply side of an alternating-current power supply to set a value calculated by subtracting a current being used in household electrical appliances from a breaker rated current as a maximum supply current value in charging the vehicle, the set charging current value being set within a range of the maximum supply current value.

2. The charging cable according to claim 1, wherein the pulse-width adjusting device comprises
   an input-signal generator configured to generate an input signal corresponding to the set charging current value input from the input section and
   an adjustment section to adjust the pulse width of the oscillation signal generated by the oscillator to correspond to the input signal.

3. The charging cable according to claim 1, further comprising a display to display the set charging current value input from the input section and an actual charging current value on a display section of the display.

4. The charging cable according to claim 1, further comprising a key lock device to forbid the input section from accepting an input when it is operated in a locked state and to allow the input section to accept an input set charging current value when it is operated in an unlocked state.

5. The charging cable according to claim 1, wherein the input section is disposed back from an surface of an ouster outer case forming a housing of the charging cable.

6. A vehicle comprising:
   a battery rechargeable from an external power supply with a charging current through the charging cable according to claim 1; and
   a charging-current adjusting device to adjust an amount of the charging current correspond to the pulse width in response to the oscillation signal having the pulse width corresponding to the set charging current value output from the oscillator of the charging cable.

7. The charging cable according to claim 2, further comprising a display to display the set charging current value input from the input section and an actual charging current value on a display section of the display.

8. The charging cable according to claim 2, further comprising a key lock device to forbid the input section from accepting an input when it is operated in a locked state and to allow the input section to accept an input set charging current value when it is operated in an unlocked state.

9. The charging cable according to claim 3, further comprising a key lock device to forbid the input section from accepting an input when it is operated in a locked state and to allow the input section to accept an input set charging current value when it is operated in an unlocked state.

10. The charging cable according to claim 7, further comprising a key lock device to forbid the input section from accepting an input when it is operated in a locked state and to allow the input section to accept an input set charging current value when it is operated in an unlocked state.

11. The charging cable according to claim 2, wherein the input section is disposed back from an outer surface of an outer case forming a housing of the charging cable.

12. The charging cable according to claim 3, wherein the input section is disposed back from an outer surface of an outer case forming a housing of the charging cable.

13. The charging cable according to claim 4, wherein the input section is disposed back from an outer surface of an outer case forming a housing of the charging cable.

14. The charging cable according to claim 7, herein the input section is disposed back from an outer surface of an outer case forming a housing of the charging cable.

15. The charging cable according to claim 8, wherein the input section is disposed back from an outer surface of an outer case forming a housing of the charging cable.

16. A vehicle charging system for a vehicle rechargeable from an external power supply with a charging current through a charging cable, the vehicle charging system comprising:
   an input section to which a set charging current value in charging the vehicle is input;
   an oscillator configured to generate an oscillation signal having a pulse width within a range of a rated current of the external power supply, the rated current being capable of being supplied to the vehicle;
   a pulse-width adjusting device configured to adjust the pulse width of the oscillation signal generated by the oscillator to correspond to the set charging current value input from the input section;

a charging-current adjusting device to adjust an amount of the charging current correspond to the pulse width in response to the oscillation signal having the pulse width corresponding to the set charging current value output from the oscillator; and a charging current setting device configured to communicate with a power-supply side of an alternating-current power supply to set a value calculated by subtracting a current being used in household electrical appliances from a breaker rated current as a maximum supply current value in charging the vehicle, the set charging current value being set within a range of the maximum supply current value.

17. The vehicle charging system according to claim 16, wherein the pulse-width adjusting device comprises an input-signal generator configured to generate an input signal corresponding to the set charging current value input from the input section and an adjustment section to adjust the pulse width of the oscillation signal generated by the oscillator to correspond to the input signal.

18. The vehicle charging system according to claim 16, further comprising a display to display the set charging current value input from the input section and an actual charging current value on a display section of the display.

19. The vehicle charging system according to claim 16, further comprising a key lock device that forbids the input section from accepting an input when it is operated in a locked state and that allows the input section to accept an input set charging current value when it is operated in an unlocked state.

20. The vehicle charging system according to claim 16, wherein the input section is disposed back from an outer surface of an outer case forming a housing thereof.

21. A charging cable for use in charging a vehicle, the charging cable comprising:

a power line used to carry power from an external power supply to the vehicle, the external power supply and the vehicle being connected to each other with the power line disposed therebetween;

an input section to which a set charging current value in charging the vehicle is input;

an oscillator configured to generate an oscillation signal having a pulse width within a range of a rated current of the external power supply, the rated current being capable of being supplied to the vehicle;

a pulse-width adjusting device configured to adjust the pulse width of the oscillation signal generated by the oscillator to correspond to the set charging current value input from the input section; and a charging current setting device configured to communicate with a power-supply side of an alternating-current power supply, the charging current setting device being configured to communicate with at least one additional charging cable used to carry power from the external power supply to at least one additional vehicle with a communication unit, the charging current setting device being configured to identify a used current of the charging cable and at least one additional used current of the at least one additional charging cable, the charging current setting device being configured to set a value calculated by subtracting a current being used in household electrical appliances from a breaker rated current as a maximum value of a sum of a charging current set using the set charging current value and at least one additional charging current set using at least one additional set charging current value input to at least one additional input section of the at least one additional charging cable.

22. A vehicle charging system for a vehicle rechargeable from an external power supply with a charging current through a charging cable, the vehicle charging system comprising:

an input section to which a set charging current value in charging the vehicle is input;

an oscillator configured to generate an oscillation signal having a pulse width within a range of a rated current of the external power supply, the rated current being capable of being supplied to the vehicle;

a pulse-width adjusting device configured to adjust the pulse width of the oscillation signal generated by the oscillator to correspond to the set charging current value input from the input section;

a charging-current adjusting device to adjust an amount of the charging current correspond to the pulse width in response to the oscillation signal having the pulse width corresponding to the set charging current value output from the oscillator; and a charging current setting device configured to communicate with a power-supply side of an alternating-current power supply, the charging current setting device being configured to communicate with at least one additional charging cable used to carry power from the external power supply to at least one additional vehicle with a communication unit, the charging current setting device being configured to identify a used current of the charging cable and at least one additional used current of the at least one additional charging cable, the charging current setting device being configured to set a value calculated by subtracting a current being used in household electrical appliances from a breaker rated current as a maximum value of a sum of a charging current set using the set charging current value and at least one additional charging current set using at least one additional set charging current value input to at least one additional input section of the at least one additional charging cable.

* * * * *